Sept. 14, 1965　　　　　F. LOLLERT　　　　　3,206,595
VEHICLE HEADLAMP AND INCANDESCENT LAMP FOR THE SAME
Filed May 15, 1963　　　　　　　　　　　　　2 Sheets-Sheet 1

INVENTOR
Franz LOLLERT by Michael J. Striker
ATTY

United States Patent Office 3,206,595
Patented Sept. 14, 1965

3,206,595
VEHICLE HEADLAMP AND INCANDESCENT
LAMP FOR THE SAME
Franz Lollert, Ludwigstr. 24, Furstenfeldbruck, Germany
Filed May 15, 1963, Ser. No. 280,749
Claims priority, application Germany, May 16, 1962,
L 41,995; May 10, 1963, L 44,862
8 Claims. (Cl. 240—41.25)

The present invention relates to a vehicle head lamp and to an incandescent lamp for use in a vehicle head lamp with a parabolic reflector.

Vehicle head lamps are known in which the high beam filament of the incandescent lamp is arranged in the reflector above and forwardly of the focus of the reflector and extending substantially normal to the optical axis of the reflector substantially parallel and above shielding means arranged in the lamp. The high beam emanating from such a lamp provides proper illumination of portions of the road distant from the vehicle on which the head lamp is used, but experience has shown that portions of the road adjacent the vehicle are illuminated only to a limited extent so that obstacles in the road, for instance holes, or the like, adjacent the vehicle are not properly observed.

It is an object of the present invention to overcome this disadvantage of head lamps known in the art.

It is a further object of the present invention to provide for an incandescent lamp for a vehicle head lamp with a parabolic reflector constructed in such a manner that the rays emanating from the head lamp will properly illuminate distant portions of the road and provide also for proper illumination of the road immediately ahead of the vehicle.

It is an additional object of the present invention to provide for a proper long range and short range illumination with a single filament of the incandescent lamp arranged in the reflector.

It is yet an additional object of the present invention to provide for an incandescent lamp to be used in combination with a parabolic reflector of a head lamp of a vehicle which is substantially free of glare and avoids any blinding effects on the operator of an oncoming vehicle.

With these objects in view, the incandescent lamp, according to the present invention, which is adapted to be used in a vehicle head lamp with a parabolic reflector, mainly comprises a light bulb having an axis, an incandescent body supported in the bulb in a plane parallel to the axis and having a rear portion extending transverse to said axis and at least one portion extending forwardly from said rear portion and being arranged laterally from the axis, and shielding means supported in the bulb beneath the incandescent body substantially in a plane parallel to said axis. The bulb is adapted to be mounted in the parabolic reflector of a vehicle head lamp with the aforementioned rear portion of the body arranged closely adjacent to above and forwardly of the focus of the reflector.

In a preferred arrangement, the incandescent body of the incandescent lamp is arranged in the reflector in such a manner that all portions of the incandescent body are arranged in a conical space having its apex at the focus of the reflector and having its base defined by the annular end edge of the reflector. In such an arrangement, substantially all rays emanating from portions of the incandescent body within the aforementioned conical space will leave the reflector downwardly inclined to the optical axis thereof so that blinding of the operator of an oncoming vehicle will be positively prevented.

If it is desired to provide for a small amount of light which leaves the head lamp in an upward direction so that objects located above the reflector may also be properly illuminated, it is also possible to arrange the incandescent body in such a manner that about 1% of the radiating surface thereof is located rearwardly of the aforementioned conical space and the portion of upwardly directed rays emanating from such an arrangement will be so small so as not to produce any blinding effect on the operator of an oncoming vehicle.

To positively prevent impingement of any rays emanating from the incandescent body of the lamp onto the lower half of the parabolic reflector, which would be reflected in upward direction and thus produce a blinding effect onto the oncoming traffic, it is preferred to form the shielding means with a downwardly extending depression inwardly of a peripheral surface thereof and to arrange the incandescent body with at least 50% and up to 85% of the radiating surface thereof below the peripheral surface portion of the shielding means within the depression formed beneath this surface. With such an arrangement it is possible to use a single incandescent body of the form mentioned above to produce simultaneously a non-blinding long range beam and a short range beam, which arrangement avoids the necessity of switching from the long range to the short range beam. One important advantage of the arrangement according to the present invention is therefore that a single incandescent body can be used for providing a long range beam without danger of producing a blinding effect on the oncoming traffic and for producing at the same time a short range beam for properly illuminating the roadway closely adjacent to the vehicle and thus avoiding the necessity of switching from a long range beam to a short range beam. The arrangement of a second incandescent body for producing a short range beam is therefore for strictly practical reasons not necessary with the arrangement according to the present invention.

However, since traffic laws in certain countries require the arrangement of a short range beam filament in addition to a long range beam filament in head lamps of automotive vehicles, it is possible to satisfy such legal requirements in certain countries by arranging in addition to the aforementioned described incandescent body also a second incandescent body in the incandescent lamp according to the present invention and this second incandescent body for producing short range beam is arranged relative to the focus of the reflector in known manner, that is extending essentially in the direction of the optical axis of the reflector and arranged forwardly of the focus thereof.

Each of the incandescent bodies according to the present invention may be formed by a single filament, a coiled filament, a double coiled filament, or a body of any other construction formed and arranged in the specific manner as described above.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which like elements are designated with like reference numerals each provided with a different letter suffix in the respective figures, and in which:

Figure 10:
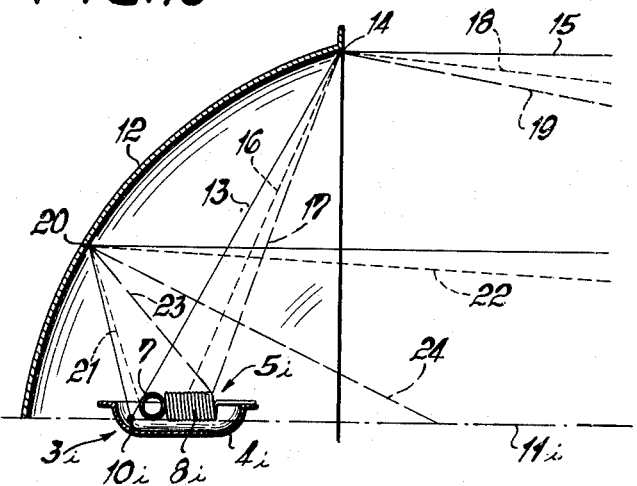
Figure 11:
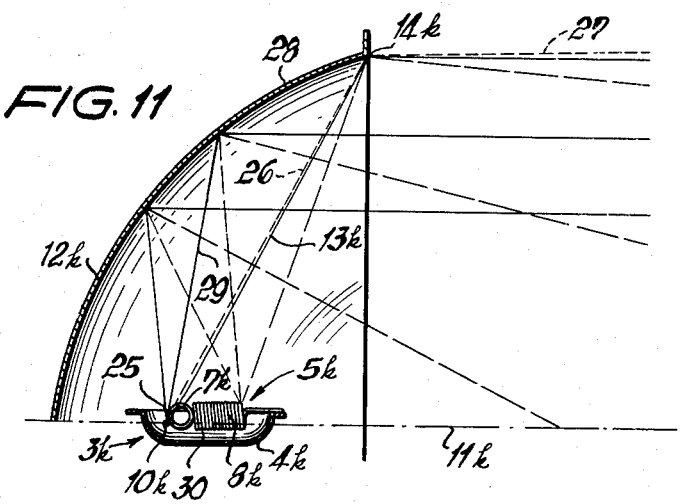

FIG. 10 is a partial schematic side view showing the arrangement of the filament and shielding means of the lamp according to the present invention relative to the parabolic reflector in which for simplification of the drawing only the filament and shielding means of the lamp are shown which are drawn to a larger scale than the reflector; and FIG. 11 shows an arrangement similar to FIG. 10 with the filament of the lamp shifted relative to the focus of the reflector.

Figure 1:
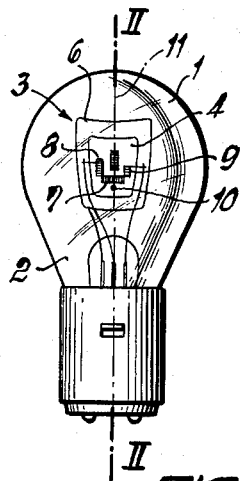
FIG. 1 is a front view of an incandescent lamp according to the present invention.
Figure 2:
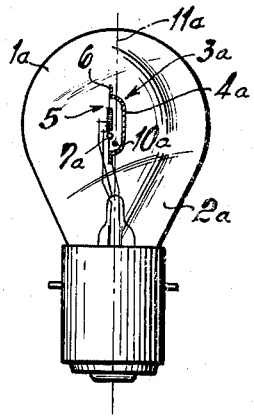
FIG. 2 is a partial cross section taken along the line II—II of FIG. 1.
Figure 3:
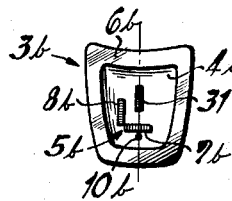
FIGS. 3–9 show front views of various arrangements of the filaments of the lamp according to the present invention and their relative arrangement to the shielding means, while the remaining portions of the lamp according to the present invention are omitted from these figures.

Referring now to the drawings and especially to FIGS. 1 and 2 of the same, it will be seen that the incandescent lamp 1 according to the present invention includes a glass bulb 2 and a socket of a well known construction. Arranged within the glass bulb 2 and held in known manner by a wire sealed in the socket end of the bulb are the shielding means 3 formed from sheet metal, and these shielding means have a peripheral surface portion 6 arranged when the lamp is mounted in a parabolic reflector of a vehicle head lamp in a substantially horizontal plane above the axis 11 of the lamp, which coincides, as can be seen from FIG. 10, with the optical axis of the reflector. The shielding means are formed inwardly of the peripheral surface 6 with a downwardly extending depression 4 as can be best seen in FIGS. 2 and 10. The long range beam incandescent body or filament 5 is located within the peripheral surface portion 6 of the shielding means 3 with at least 50% and up to 85% of the body located in the depression 4 below the peripheral surface portion 6. The incandescent body or filament 5 for the long range beam is shown in FIGS. 1 and 2 as a coiled filament having a rear portion 7 extending substantially normal and to opposite sides of the axis 11 of the lamp and a pair of leg portions 8 and 9 extending forwardly from the rear portion 7 at opposite sides and substantially parallel to the axis 11. The long range beam filament 5 is held in the glass bulb 2 in known manner by two wires connected to the free ends of the leg portions of the body 5 and passing in a sealed manner through the socket end of the lamp to be connected to contacts at the socket end in a known manner to supply the incandescent body 5 with electrical current. The rear portion 7 of the incandescent body 5 is arranged, as can be best seen from FIG. 10 closely adjacent to above and forwardly of the focus 10 of the reflector 12, whereas the two leg portions 8 and 9 are arranged at the same elevation as the rear portion 7 and extend substantially parallel and respectively on opposite sides of the optical axis 11 of the parabolic reflector 12.

FIG. 10 illustrates schematically the arrangement of the filament and the shielding means of the incandescent lamp according to the present invention with respect to the parabolic reflector of a vehicle head lamp. As mentioned before, the schematic views of FIGS. 10 and 11 show only the filament and the shielding means of the lamp while omitting the other lamp portions and for simplification reasons these filaments and shielding means are drawn to a larger scale than the reflector itself. FIG. 10 shows an arrangement in which the rear portion 7 of the incandescent body is located in a conical space within the parabolic reflector 12, which conical space has its apex at the focus 10 of the reflector whereas the base of the conical space is defined by the annular edge portion 14 of the reflector. As can be seen from FIG. 10, this arrangement will produce a beam in which none of the rays leaving the reflector will pass in upward direction beyond the highest point of the annular edge 14 of the reflector.

As is evident from FIG. 10, the shielding means 3 will prevent any rays emanating from the incandescent body 7, 8 to impinge onto the lower half of the reflector 12.

If one considers the rays which pass along the surface of the aforementioned conical space through the focus of the reflector, it will be seen that these rays 13 leave the reflector 12 as rays 15 parallel to the optical axis 11 of the reflector. All rays emanating from the leg portions 8 and 9 of the incandescent body, for instance the rays 16 and 17 leave the reflector as downwardly inclined rays 18 and 19 and produce therefore no blinding effect. The rays 22 emanating from the rear portion 7 and impinging on any other point of the upper reflector half, for instance on the point 20 are reflected as downwardly inclined rays 22 and the rays 23 emanating from the leg portions 8 and 9 are reflected as likewise downwardly inclined rays 24. The rear portion 7 of the incandescent body will therefore produce substantially horizontal and substantially parallel rays which will provide a long range beam, whereas the leg portions 8 and 9 will be reflected by the reflector 12 in a more downwardly inclined short range beam which will properly illuminate the roadway directly in front and laterally of the vehicle on which the head lamp according to the present invention is used.

If it is desired to produce also an illumination of objects ahead of the vehicle which are located above the highest portion of the annular edge 14 of the reflector 12 without, however, producing a blinding effect on the oncoming traffic, then the incandescent body 7, 8 and the shielding means 3, 4 are arranged with respect to the optical axis 11 and the focus 10 of the reflector 12 in the manner as shown in FIG. 13, in which a small part 25 of the rear portion 7 of the incandescent body is arranged rearwardly of the aforementioned conical space having its apex at the focus 10 of the reflector 12 and having a base defined by the annular edge 14 thereof. The part 25 located rearwardly of the cone surface 13 should however not constitute more than about 1% of the radiating surface of the incandescent body including the leg portions 8 and 9 thereof. In this case the illumination produced by the rays 26 emitted from the portion 25 of the incandescent body will be so weak as to not to produce any blinding effect. The rays 26 are reflected by the reflector 12 in such a manner that they leave the reflector in the form of slightly diverging rays 27. These diverging rays 27 will properly illuminate objects on the roadway in front of the vehicle which are located above the uppermost portion of the annular edge 14 of the reflector, such as for instance tree branches or upper portions of oncoming vehicles. The illumination produced by the rays 27 will be however so weak so as not to produce any blinding effect on oncoming traffic, especially since the rays 27 are reflected only by the small sector 28 of the reflector which is located between the annular edge 14 and the tangents 29 drawn through the focus 10 onto the rear portion 7 of the incandescent body.

The arrangement shown in FIG. 11 differs also from that shown in FIG. 10 in that a portion 30 of the incandescent body 5 is located below the optical axis 11, whereas in the arrangement shown in FIG. 10 the incandescent body 5 is located in its entirety above the optical axis.

FIGS. 3-9 show different modifications of a high beam filament according to the present invention.

FIGS. 3, 6 and 7-9 show high beam filaments which have in addition to the rear portion 7 only a left leg portion 8, or left and right leg portions 8 and 9 in which however the right leg portion 9 is considerably shorter than the left leg portion 8. Such arrangement as shown in these figures will provide an especially bright light on the right portion of the roadway and these arrangements are preferably used in countries having a right hand traffic.

Figure 4:
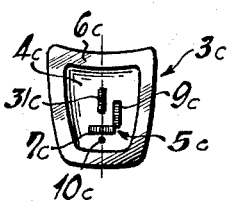
Figure 5:
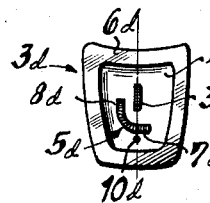
Figure 6:
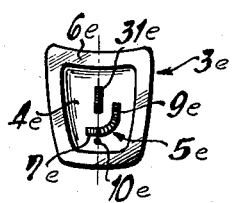
Figure 7:
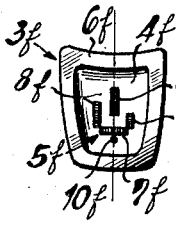
Figure 8:
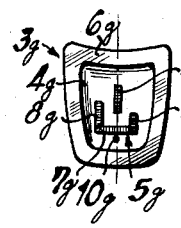
Figure 9:
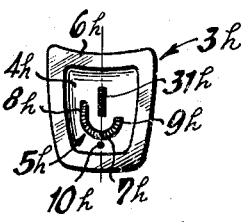

The arrangements shown in FIGS. 4 and 6 have only a right leg portion 9 extending forwardly to one side of the axis of the bulb from the rear portion 7 and these arrangements will provide for an especially bright light on the left portion of the roadway and are therefore adapted for left hand traffic. For left hand traffic, it would also be possible to provide leg portions on opposite sides of the optical axis, in which however the right leg portions are made shorter than the left leg portions so that the left side of the roadway is better illuminated than the right side thereof.

The rear portion 7 of the incandescent body 5 is arranged in all modifications of the lamp according to the present invention closely adjacent to substantially above and forwardly of the focus 10 of the reflector. This arrangement according to the present invention provides for a perfect and substantially uniform illumination of the roadway ahead of the vehicle on which the lamp is used without producing a blinding effect on oncoming traffic. The above described assymetrical arrangement will be used for right hand or left hand traffic when a more intense illumination of one side of the roadway is preferred.

As mentioned above, it is not necessary for technical or illuminating reasons to provide an additional short range beam filament. However, when traffic laws require an additional short range beam filament, such a short range beam filament 31 may be provided in addition to the filament 5, and the short range beam filament 31 is arranged at the same elevation as the filament 5 extending in direction of the axis 11 forwardly of the focus 10 of the reflector as illustrated in FIGS. 1–9. It is understood that the filament 31 is supported and supplied with current in similar manner as the filament 5, however for simplification and reason of clarity the wires supporting the filament 31 and supplying the same with electrical current are not shown in these figures.

It will be understood that each of the elements described above, or two or more together, may also find a useful application in other types of incandescent lamps for use in a vehicle head lamp with a parabolic reflector.

While the invention has been illustrated and described as embodied in a vehicle head lamp for simultaneously producing a long range and a short range beam, it is not intended to be limited to the details shown, since various modifications and structural changes may be made without departing in any way from the spirit of the present invention.

I claim:

1. In a vehicle headlamp, in combination, a parabolic reflector having an optical axis and a focus; an incandescent lamp arranged in said reflector with the axis of said lamp coinciding with said optical axis, said lamp including a glass bulb, an incandescent body supported in said bulb in a plane substantially parallel to said axis and having a rear portion extending transverse to said axis and a portion extending forwardly from said rear portion laterally from said axis only at one side of the latter, said rear portion of said body being arranged closely adjacent to, substantially above and forwardly of said focus of said parabolic reflector; and shielding means supported in said bulb beneath said incandescent body substantially in a plane parallel to said axis.

2. In a vehicle headlamp, in combination, a parabolic reflector having an optical axis and a focus; an incandescent lamp arranged in said reflector with the axis of said lamp coinciding with said optical axis, said lamp including a glass bulb, an incandescent body supported in said bulb in a plane substantially parallel to said axis and having a rear portion extending substantially normal to and across said axis and a portion extending forwardly from one end of said rear portion substantially parallel to and only on one side of said axis, said rear portion of said body being arranged closely adjacent to, substantially above and forwardly of said focus of said parabolic reflector; and shielding means supported in said bulb beneath said incandescent body substantially in a plane parallel to said axis.

3. In a vehicle headlamp, in combination, a parabolic reflector having an optical axis, a focus and an annular end edge; an incandescent lamp arranged in said reflector with the axis of said lamp coinciding with said optical axis, said lamp including a glass bulb, an incandescent body supported in said bulb in a plane substantially parallel to said axis and having a rear portion extending transverse to said axis and a portion extending forwardly from said rear portion laterally from said axis only at one side of the latter, said incandescent body being located within a conical space in said reflector having its apex at said focus and its base defined by said annular edge and said rear portion of said body being arranged closely adjacent to, substantially above and forwardly of said focus of said parabolic reflector; and shielding means supported in said bulb beneath said incandescent body substantially in a plane parallel to said axis.

4. In a vehicle headlamp, in combination, a parabolic reflector having an optical axis, a focus and an annular edge; an incandescent lamp arranged in said reflector with the axis of said lamp coinciding with said optical axis, said lamp including a glass bulb, an incandescent body supported in said bulb in a plane substantially parallel to said axis and having a rear portion extending transverse to said axis and a portion connected to said rear portion and arranged laterally from said axis only at one side of the latter and extending further forwardly from said focus than the remainder of said incandescent body, the major portion of the radiating surface of said incandescent body being located within a conical space in said reflector having its apex at said focus and its base defined by said annular edge and about 1% of said surface being located rearwardly of said conical space and said rear portion of said body being arranged closely adjacent to, substantially above and forwardly of said focus of said parabolic reflector; and shielding means supported in said bulb beneath said incandescent body substantially in a plane parallel to said axis.

5. In a vehicle headlamp, in combination, a parabolic reflector having a horizontal optical axis and a focus; an incandescent lamp arranged in said reflector with the axis of said lamp coinciding with said optical axis, said lamp including a glass bulb, an incandescent body supported in said bulb in a plane substantially parallel to said axis and having a rear portion extending transverse to said axis and a portion connected to said rear portion and arranged laterally from said axis only at one side of the latter and extending further forwardly from said focus than the remainder of said incandescent body, said rear portion of said body being arranged closely adjacent to, substantially above and forwardly of said focus of said parabolic reflector; and shielding means supported in said bulb beneath said incandescent body substantially in a plane parallel to said axis, said shielding means having a peripheral surface portion arranged in a horizontal plane slightly above said axis and being formed inwardly of said peripheral surface portion with a downwardly extending depression, said incandescent body being located within said peripheral surface portion with at least 50% of said body located in said depression beneath said peripheral surface portion and the remainder of said body being located above said peripheral surface portion.

6. In a vehicle headlamp, in combination, a parabolic reflector having a horizontal optical axis and a focus; an incandescent lamp arranged in said reflector with the axis of said lamp coinciding with said optical axis, said lamp including a glass bulb, an incandescent body supported in said bulb in a plane substantially parallel to said axis and having a rear portion extending transverse to said axis and a portion connected to said rear portion and arranged laterally from said axis only at one side of the latter and extending further forwardly from said focus than the remainder of said incandescent body, said rear portion of said body being arranged closely adjacent to, substantially above and forwardly of said focus of said parabolic reflector; and shielding means supported in said bulb beneath said incandescent body substantially in a plane parallel to said axis, said shielding means having a peripheral surface portion arranged in a horizontal plane slightly above said axis and being formed inwardly of said peripheral surface portion with a downwardly extending depression, said incandescent body being located within said peripheral surface portion with 50%–85% of said body located in said depression beneath said peripheral surface portion and the remainder of said body being located above said peripheral surface portion.

7. In a vehicle headlamp, in combination, a parabolic reflector having a horizontal optical axis and a focus; and an incandescent lamp arranged in said reflector with the axis of said lamp coinciding with said optical axis, said lamp including a glass bulb, a high beam filament supported in said bulb in a plane substantially parallel to said axis and having a rear portion extending transverse and to opposite sides of said axis and a portion connected to said rear portion and arranged laterally from said axis only at one side of the latter and extending further forwardly from said focus than the remainder of said incandescent body, said rear portion of said high beam filament being arranged closely adjacent to, substantially above and forwardly of said focus of said parabolic reflector, a low beam filament extending substantially in a vertical plane passing through said axis forwardly spaced from said rear portion of said high beam filament, and shielding means supported in said bulb beneath said filaments substantially in a horizontal plane.

8. In a vehicle headlamp, in combination, a parabolic reflector having an optical axis and a focus; an incandescent lamp arranged in said reflector and having an axis coinciding with said optical axis, said lamp including a glass bulb and an incandescent body supported in said bulb in a plane substantially parallel to said axis, said incandescent body being located substantially in its entirety forwardly of said focus and extending with a portion thereof arranged laterally from said axis much further forwardly from said focus than the remainder of said incandescent body; and shielding means supported in said bulb beneath said incandescent body substantially in a plane parallel to said axis.

References Cited by the Examiner
UNITED STATES PATENTS

| | | | |
|---|---|---|---|
| 2,006,839 | 7/35 | Moller | 240—41.25 |
| 2,045,512 | 6/36 | Bergmann | 240—41.25 |
| 2,214,472 | 9/40 | Lund | 240—41.25 X |
| 3,107,866 | 10/63 | Nowak | 240—41.25 |

FOREIGN PATENTS

| | | |
|---|---|---|
| 220,713 | 4/62 | Austria. |
| 838,910 | 6/60 | Great Britain. |

NORTON ANSHER, *Primary Examiner.*